W. DAVIS.
Preserving Meat, &c.

No. 78,932.  Patented June 16, 1868.

Witnesses
Aby. A. C. Hauck
Frank A. Jackson

Inventor
William Davis

UNITED STATES PATENT OFFICE.

WILLIAM DAVIS, OF DETROIT, MICHIGAN.

IMPROVEMENT IN PRESERVING MEAT, &c.

Specification forming part of Letters Patent No. 78,932, dated June 16, 1868.

*To all whom it may concern:*

Be it known that I, WILLIAM DAVIS, of Detroit, in the county of Wayne and State of Michigan, have invented a new and useful Improvement in Apparatus for Preserving Fresh Meats, Fish, Fruits, &c.; and I do hereby declare the following to be a full and correct description of the same, sufficient to enable others skilled in the art to which my invention appertains to make and use the same, reference being had to the accompanying drawings, which make part of this specification, and in which—

Figure 1:
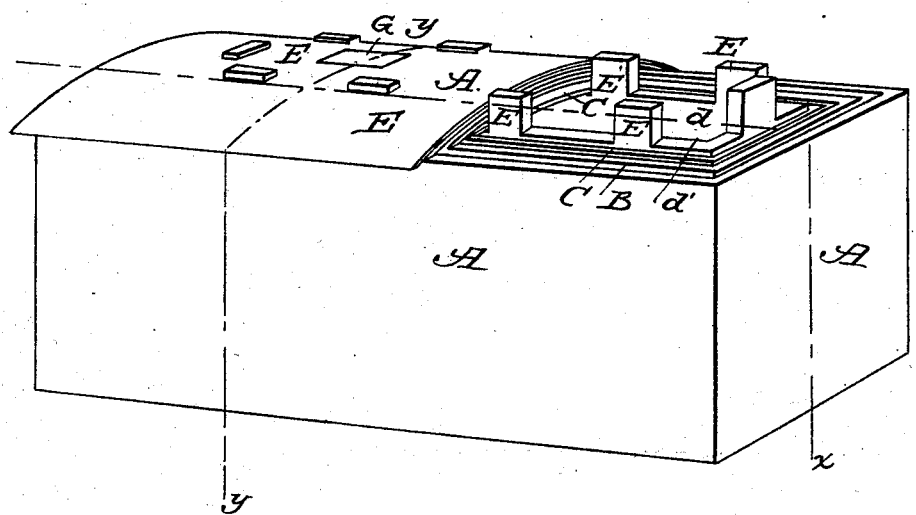
Figure 2:
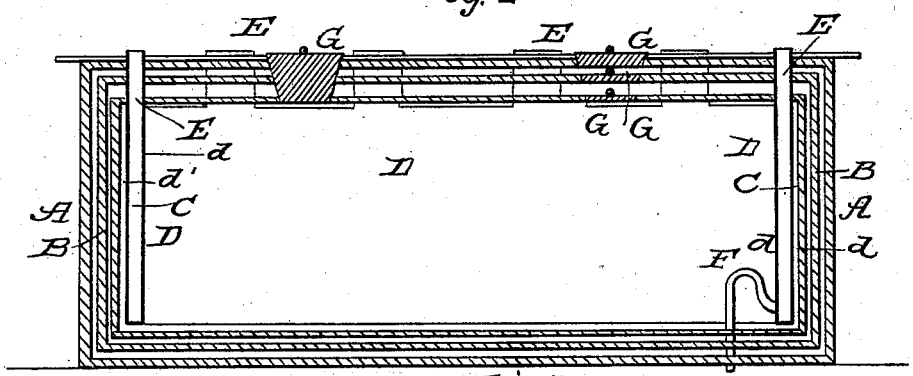
Figure 3:
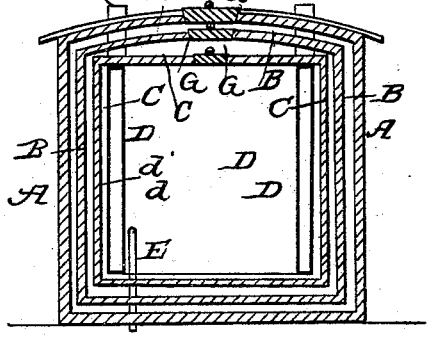

Figure 1 is a perspective view of my apparatus. Fig. 2 is a longitudinal section of the same in line *x x*, Fig. 1; and Fig. 3 is a cross-section of the same in line *y y*, Fig. 1.

Like letters of reference indicate like parts in the several figures.

The nature of my invention consists in the peculiar construction of a railroad-car, box, chest or room, in which to preserve animal and vegetable substances from decay for a certain reasonable time, to allow them to be transported from place to place or kept in store in a sweet and fresh condition.

In the drawings I have represented the body of a railroad-car constructed according to my invention. This is constructed of three separate compartments, A B C, one within the other, and arranged in such a manner that an open space is all around the innermost compartment C, as well as the compartment B. These spaces I fill with poor conductors of heat, such as animal hair, dry shavings, &c. Inside of the compartment C is the ice-receptacle D, which consists of a double wall, *d d'*, extending from the bottom to the top of compartment C, and closed air-tight, except where chimneys or funnels E extend upward from the receptacle D through the roofs of the compartments A B C, and which serve to contain the freezing mixture, which is filled in through the chimneys or funnels E. I do not confine myself to any particular freezing mixture, as any known mixture, in any known proportions, will answer and may be used, according to circumstances. The chimneys or funnels E are provided with covers or caps which close the receptacle D as air-tight as practicable, and which have a part extending down through chimneys E, just below the roof of compartment C, so that any heat passing through the spaces between the compartments, through which the chimneys pass, cannot be communicated through the latter to the receptacle D.

The water or fluid which melts from the freezing mixture is collected at the lower part of the receptacle D, which is provided with a goose-neck trap, F, or other equivalent device, through which the water can escape without any air being admitted into the receptacle, sufficient air always being contained in the same to allow the water to flow.

Access to the inside of the car is had through hatchways or doors in the roofs of the compartments A B C, which are closed practically air-tight by hatches G, each separate compartment being provided with one, or one door serving to close all three hatchways, as shown in Fig. 2. These hatches G, I prefer to construct with beveled sides to fit the beveled hatchways, as I am able to close the latter much more effectually than could be done if they were made straight.

Doors may be constructed in the side of the car and closed in the same manner as the hatchways in the roof. Thus a car may be loaded at the starting-point with meats, fruits, &c., which are placed in the space surrounded by receptacle D through the side doors, which can then be closed, as above described. To discharge freight at way-stations the hatchways must be used, for if the side doors were opened, the cold and consequently heavier atmosphere would pass out, while the warm outside atmosphere would at once fill the car and affect its contents; but when the hatchways in the roof are opened the cold and heavy air cannot rise out of the car, nor can the outer warmer atmosphere descend into the car to displace the heavy cold air, and thus part of the freight may be discharged from the car through the roof-doors as often as may be necessary, without danger of admitting outside air, thus effectually confining the cold air in the car.

Having thus described my invention, what I claim as new therein, and desire to secure by Letters Patent, is—

1. The construction of a car-body, room, box, or chest, provided with compartments A B C, ice-receptacle D, chimneys or funnels E, and hatches G, when arranged and operating substantially as described, and for the purposes set forth.

2. The goose-neck trap, or equivalent, in combination with the receptacle D and compartments A B C, when arranged substantially as and for the purposes set forth.

WILLIAM DAVIS.

Witnesses:
H. F. EBERTS,
LEWIS L. GORDON.